No. 827,500. PATENTED JULY 31, 1906.
C. N. BROWN.
METHOD OF MAKING BIFOCAL LENSES.
APPLICATION FILED JAN. 25, 1906.

Witnesses.
C. H. Garnett
J. Murphy

Inventor.
Charles N. Brown
by Jas. H. Churchill
Atty.

UNITED STATES PATENT OFFICE.

CHARLES N. BROWN, OF QUINCY, MASSACHUSETTS, ASSIGNOR TO F. A. HARDY & COMPANY, OF CHICAGO, ILLINOIS, A CORPORATION.

METHOD OF MAKING BIFOCAL LENSES.

No. 827,500.     Specification of Letters Patent.     Patented July 31, 1906.

Application filed January 25, 1906. Serial No. 297,755.

*To all whom it may concern:*

Be it known that I, CHARLES N. BROWN, a citizen of the United States, residing in Quincy, in the county of Norfolk and State of Massachusetts, have invented an Improvement in Methods of Making Bifocal Lenses, of which the following description, in connection with the accompanying drawings, is a specification, like letters on the drawings representing like parts.

This invention relates to a novel method of making composite lenses composed, preferably, of different qualities, kinds, or index of glass, so that the component parts of said lens are molecularly united to form an integral lens.

Prior to this invention composite lenses have been made by grinding and polishing the component parts and then cementing them together by means of a transparent cement.

In accordance with this invention one member of the composite lens is provided with a concavity of one curvature and the coöperating member of said lens is provided on one side with a curved surface of a different and smaller arc or curvature than the curvature of the concavity, and the curved surface of said second member is placed in the concavity of the first member, and both are subjected to heat sufficient to soften the second member and permit it to conform to the curvature of the concavity and be fused or molecularly united thereto.

Figure 1:
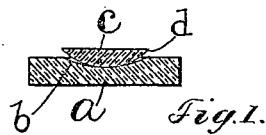
Figure 2:
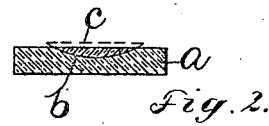
Figure 3:
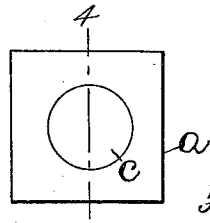
Figure 4:
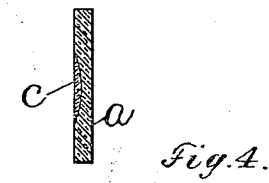
Figure 5:
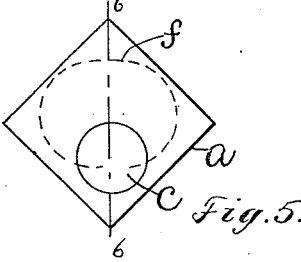
Figure 6:
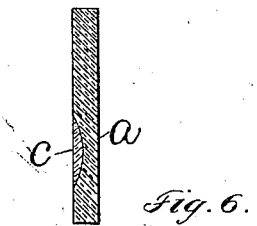
Figure 7:
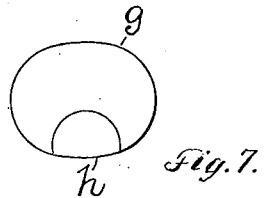

Figure 1 represents in section the component members from which a composite lens is made in accordance with this invention. Fig. 2 represents the members shown in Fig. 1 as molecularly united; Fig. 3, an elevation of the members shown in Fig. 2 with the surplus material of one member removed; Fig. 4, a section on the line 4 4, Fig. 3; Fig. 5, an elevation of the molecularly-united members in a different relation from that shown in Fig. 3, the lens being indicated by dotted lines; Fig. 6, a section on the line 6 6, Fig. 5; Fig. 7, an elevation of a composite lens ground or cut from the piece represented in Fig. 5, and Figs. 8 and 9 sectional views of modified forms of composite lenses made in accordance with this invention.

In order that the invention may be clearly comprehended, I will describe the method employed for producing the simple form of lens shown in Fig. 7. To this end a rough piece or slab $a$ of one kind, quality, or index of glass, preferably crown, is ground and polished upon one side or face to form a concavity $b$ of any desired or selected curvature. A second piece $c$ of glass of a different index, kind, or quality, preferably flint, is ground and polished to form on one side or face a curved surface $d$, the curvature of which is smaller than but approximates the curvature of the concavity $b$. The pieces $a$ $c$ are then fitted together, one resting on the other, and I prefer to place the smaller piece $c$ upon the larger piece $a$, as represented in Fig. 1. The pieces $a$ $c$ are then subjected to a heat sufficient to form a fusion or molecular union of the contacting surfaces without destroying the curvature of the concavity. The heating of the pieces $a$ $c$ may be effected in a muffle, (not shown,) as it may be of any suitable or usual construction. The piece $c$ of flint-glass softens under the heat more quickly than the crown, and when sufficiently softened or plastic it is pressed into the concavity $b$, or it may be allowed to drop of its own weight until it fills the concavity $b$, as represented in Fig. 2. The curved surface of the harder crown-glass is softened sufficiently to effect a union or fusion with the softer flint-glass, and care should be exercised not to heat the crown-glass to such extent as to injure or destroy the curvature of the concavity.

By making the curved surface $d$ of the flint-glass piece $c$ of a smaller radius than that of the concavity $b$ a space is left between the outer circumference of the concavity $b$ and the outer portion of the curved surface $d$, and as a result opportunity is afforded for the escape of air between the surfaces of the pieces $a$ $c$ as the latter softens and makes contact with the surface of the concavity $b$, the union between the two surfaces starting at the central point of contact and extending toward the edge or circumference of the concavity, and as a result a more perfect union is obtained and defects due to air-bubbles are avoided. I may prefer to exert a slight pressure upon the uppermost piece, which may be either, but which is shown as the piece $c$ of flint-glass, as the pressure can be first applied at the center and then gradually toward the edges of the piece c. Care should be exercised to remove any dust from the curved surfaces b d.

When the pieces a c have been molecularly united or fused together, as described, which may be determined by inspection, the pieces thus united are annealed, which may be accomplished in the same muffle or in a separate annealing-furnace. After the annealed pieces have become sufficiently cooled they are removed from the muffle or annealing chamber and ground to remove the surplus material (represented by the dotted line in Fig. 2) to form a blank (represented in Fig. 3 to 6, inclusive) from which the composite lens (shown in Fig. 7) may be cut or ground, as represented by the dotted line f in Fig. 5, the said composite lens comprising the two lenses g h, which are molecularly united.

Figure 8:
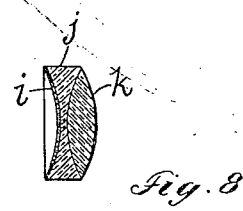
Figure 9:
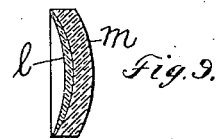

The composite lens, shown in Fig. 8 as composed of three members i j k and that shown in Fig. 9 as composed of two members l m, may be made after the method above described.

I claim—

1. The method of making blanks for composite lens, which consists in providing the members of the blank with curved surfaces of different curvatures, placing the curved surfaces in contact, and heating the said surfaces to cause the surface of one curvature to change its shape and conform to the curvature of the other surface and unite therewith, substantially as described.

2. The method of making composite lenses, which consists in grinding or otherwise forming a concavity of a given radius in the surface of one piece of glass, grinding or otherwise forming a convex surface of a smaller radius on the surface of a second piece of glass, placing said pieces of said glass one on top of the other with the convex surface of smaller radius extended into the concavity of larger radius, subjecting the whole to heat to cause the curved surface of one piece of glass to conform to the shape or form of the curved surface of the other piece of glass and effect a fusion or union of said surfaces and thereby form a blank, and afterward grinding or cutting the said blank to form a composite lens, substantially as described.

3. The method of producing a one-piece bifocal lens, which consists in preparing a cavity of one radius in a piece of glass, preparing a segment of glass differing in kind from said piece with a curved surface of different radius from that of the said cavity, assembling the said segment and piece and subjecting the piece and segment to heat to change the shape or form of the curved surface of one of said parts and cause it to conform to and unite with the curved surface of the other of said parts.

In testimony whereof I have signed my name to this specification in the presence of two subscribing witnesses.

CHARLES N. BROWN.

Witnesses:
JAS. H. CHURCHILL,
J. MURPHY.